United States Patent Office 3,114,638
Patented Dec. 17, 1963

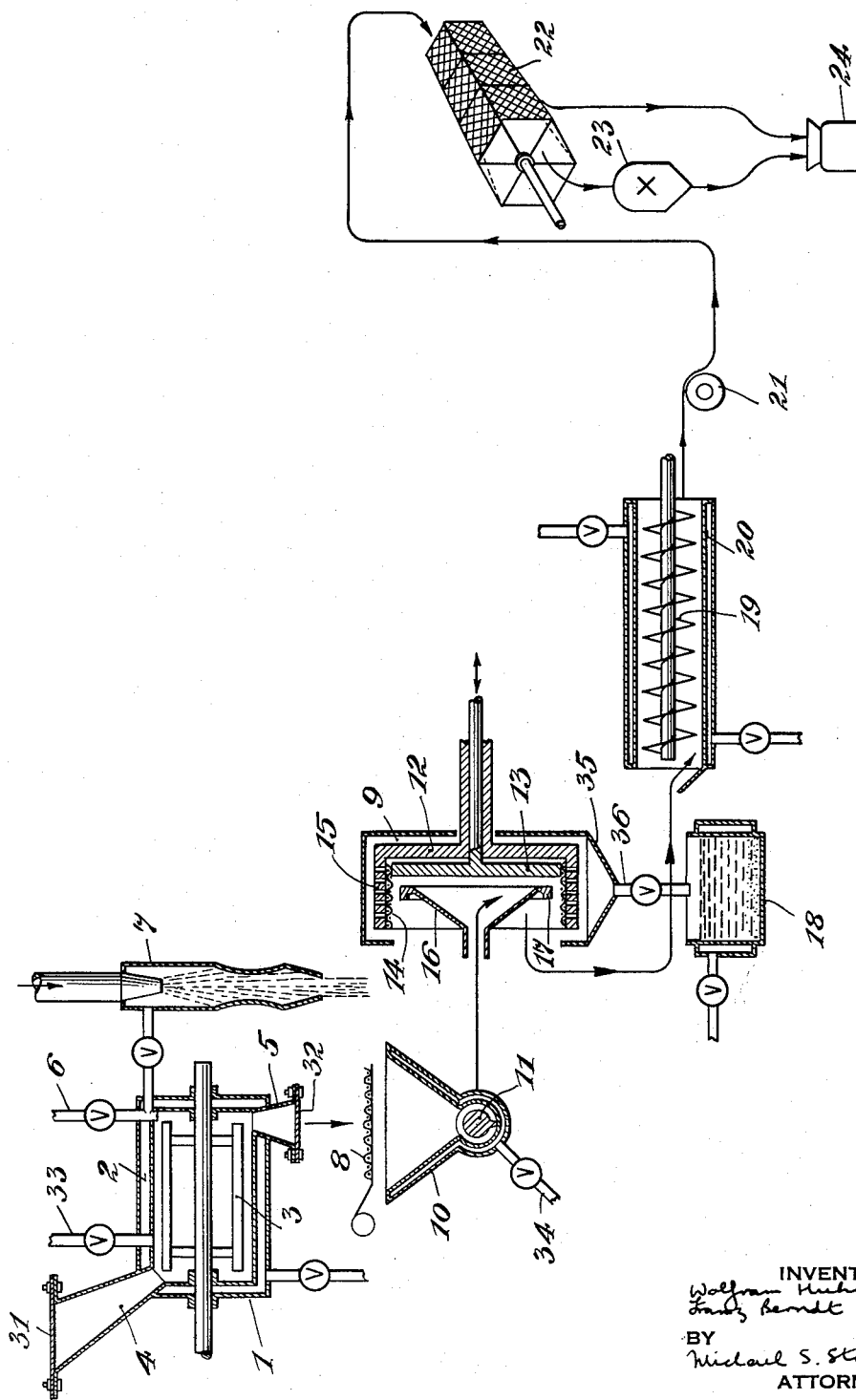

3,114,638
METHOD FOR TREATMENT OF FATTY
ANIMAL MATERIAL
Wolfram Huhn, Munich-Obermenzing, and Franz Berndt, Mering, near Augsburg, Germany, assignors to Krauss-Maffei Aktiengesellschaft, Munich-Allach, Germany
Filed Aug. 1, 1960, Ser. No. 46,428
Claims priority, application Germany Aug. 5, 1959
3 Claims. (Cl. 99—7)

The present invention relates to a method for the extraction and treatment of fatty animal materials, and more particularly, the present invention is concerned with the recovery of fat and feed stuffs from animal carcasses, slaughter-house waste products and the like.

According to established methods, animal carcasses, slaughter-house waste products and the like are first separated into bones and a bone-free portion consisting essentially of meat and fat, and the bone-free portion is then heated in a closed vessel for several hours at the boiling temperature of water therein in order to boil the meat portion of the material to a pulp and to sterilize the material. Thereafter, the thus formed pulp which contains a considerable quantity of water, as well as glue and fat, is allowed to settle so that the various constituents will form superposed layers in order of their specific weights. The fat is then drawn off and the aqueous liquid which forms a layer between the fat and the pulp is subjected to thickening by evaporation and drying, while the lowermost layer, namely a water-containing pulp also has to be de-watered and dried. The feed stuffs which are thus obtained are characterized by an undesirable high fat content which will not only reduce the storage life of the feed stuff, but also the yield of separated fat. Furthermore, the feed stuffs produced from the pulp layer are impoverished due to the loss of protein and vitamins in the supernatant aqueous layer. Apart from the foregoing disadvantages, the drying of the pulp requires very considerable heat energy and thus reduces the economic feasibility of this method.

It has also been proposed, in order to increase the yield of separated fat, to mechanically comminute the animal carcasses and the like including the bone portions thereof, so as to form a pulp-like mass, to sterilize the thus formed pulp by heating to the boiling temperature of water and subsequently to separate the molten fat from the residue of the mass by discontinuous centrifuging preferably by means of a peeler centrifuge. In this manner it is possible to increase the yield of fat or oil, however, the centrifuge residue still consists of a highly diluted suspension of solid constituents to which bran, broken barley and antibiotics have to be added in order to transform the residue into a crumply and sterile mass suitable for feeding purposes. Furthermore, comminution of the bone portions-containing meat requires very considerable power.

Thus, the present methods of converting animal carcasses, slaughter-house residue, fish or the like into a fat portion and into a feed stuff are relatively uneconomical in view of the heat and power required and particularly also in view of the discontinuous manner in which individual steps of these processes are carried out.

It is therefore an object of the present invention to overcome the aforementioned disadvantages in the conversion of animal material into feed stuff and separated fat or oil.

It is another object of the present invention to provide a method of converting animal material which method can be carried out in a simple and economical manner.

It is a further object of the present invention to provide a continuous method of converting animal material which method can be carried out in a substantially completely mechanized manner without manual contact between personnel and the material and without a loss of material due to scattering and other difficulties in the transfer of intermediate products from one prior art process step to the next.

It is still a further object of the present invention to provide a method and apparatus for carrying out the conversion of animal material into fat and feed stuff in such a manner that relatively little power and heat will be required and thus the economic advantages of the process will be increased.

Other objects and advantages of the present invention will become apparent from a further reading of the description and of the appended claims.

With the above and other objects in view, the present invention is concerned with a method for the extraction and treatment of animal material, comprising the steps of subjecting water-containing animal material including bones, fat and meat to heating at the boiling temperature of water so as to evaporate a portion of the water and to reduce the water content of the animal material to between about 7 and 9% of its total weight, thereby transforming the material into a pulp having solid bodies including bone portions distributed therethrough, separating the solid bodies from the pulp, and subjecting the bone-free pulp to centrifuging at a temperature above the melting point of the fatty constituents of the pulp so as to separate the same into fatty constituents and into a substantially solid residue.

According to a preferred manner of carrying out the method of the present invention, the same includes the steps of heating water-containing animal material including bone portions, fat and meat at a pressure of about 5 atmospheres and a temperature of about 130° C. for a period of time sufficient to sterilize the material, subjecting the sterilized material to a temperature of about 70° C. and a partial vacuum sufficiently low to cause evaporation of water from the material at the partial vacuum, for a period of time sufficient to reduce the water content of the material to between about 7 and 9%, so as to transform the material into a pulp having solid bodies including bone portions distributed therethrough, continuously separating the solid bodies from the pulp while maintaining the temperature thereof above the melting point of its fatty constituents, continuously subjecting the bone-free pulp to centrifuging so as to separate molten fat from the residue of the pulp, cooling the thus formed residue to substantially ambient temperature thereby solidifying the same, and comminuting the solidified residue.

The present invention is also concerned with an apparatus for processing animal material comprising, in combination, heating means for heating bones, fat and meat-containing animal material to the boiling temperature of the water contained therein so as to reduce the water content of the animal material and to transform the same into a pulp having solid bodies distributed therethrough, means operatively connected to said heating means for separating the solid bodies from the pulp, centrifuge means for receiving and centrifuging the pulp at a temperature above the melting point of the fat contained therein so as to separate the pulp into a fatty portion and a residue, comminuting means for comminuting the residue, and conveying means for passing the residue from the centrifuge means to the comminuting means.

Thus, the present invention provides a method and apparatus for converting animal material into feed stuff and a separated fat portion whereby a high yield of fat is obtained and a feed stuff which will not deteriorate for prolonged periods of time.

According to the present invention, the bone portions-containing animal material is heated until the water content of the material has been reduced to between about 7 and 9%. Thereafter, the solids remaining in the thus cooked mass, i.e. bones, horn portions and the like are screened off (together with solid foreign materials such as metal bodies and the like), the thus formed pulp which is free of solid bodies such as bone portions and the like, is maintained at or above the melting temperature of its fatty constituents, and thereafter, these molten fatty constituents are separated from the residue by continuous centrifuging. In this manner, a de-fatted centrifuge residue is formed which is of a crumbly consistency and which is further comminuted after being cooled to room or ambient temperature.

It is one of the advantages of the present invention that apart from the formation of the bone-containing pulp by evaporation of the major portion of the water content of the animal product—all of the subsequent steps of the process can be carried out in a fully continuous manner so that operating costs are reduced to a minimum. Due to the fact that evaporation of water from the meat portion of the animal product is terminated when the water content is still between 7 and 8%, and due to the fact that after centrifuging the residue is cooled, no undesirable degradation of protein constituents to a horny mass will take place and consequently an easily digestible and nutritious feed stuff will be obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the drawing is a schematic illustration of a device for carrying out the process of the present invention.

Animal carcasses or carcass portions which still contain bones are introduced into digester 1. Digester 1 includes a jacketed vessel 2 which can be heated by introducing steam into the jacket. A stirring device 3 is located within vessel 2 and is suitably driven or rotated by a motor or other driving means (not shown) located outside of vessel 2. Raw material is introduced into vessel 2 through funnel 4 and the cooked material leaves vessel 2 through funnel 5. Funnels 4 and 5 are provided with vapor tight covers 31 and 32. Furthermore, the interior of vessel 2 may be vented through valve-closed conduit 6. Steam is introduced into the jacket of vessel 2 through conduit 33.

The animal carcasses or the like, including bones, fat and meat which are introduced into vessel 2 are heated therein by the steam introduced into the jacket of vessel 2 so that the animal material will be boiled and the water content thereof will be reduced. Thereby, operation of stirring device 3 will cause a substantial homogenization of the contents of vessel 2. After sufficient water has evaporated (and the thus formed steam vented through conduit 6) so that the residual water amounts to between 7 and 9% of the animal material, vessel 2 is emptied through funnel 5 and the pulp formed in vessel 2 passes over shaking screen 8 on which solid bone particles, horn portions, solid foreign materials and the like are separated. The pulp passing through shaking screen 8 passes through a steam heated trough 10 into screw conveyor 11 and is introduced by screw conveyor 11 into centrifuge 9. As can be seen, centrifuge 9 is rotatable about a horizontal axis. Trough 10 and preferably also conveying screw 11 are jacketed and steam heated by means of steam introduced into the jacket through conduit 34. Thereby it is achieved that the mass introduced into centrifuge 9 will be at a temperature at least as high as the melting point of the fatty constituents of the mass. Consequently, it is possible to remove all but 8% of the fat from the meat pulp during centrifuging of the mass. Centrifuge 9 includes a perforated drum 12 with a screen insert 14 through which the molten fat will be removed by centrifugal action into a housing 35 from which the molten fat will pass through conduit 36 into fat collector 18. Fat collector 18 is provided with a steam heated jacket. The thus de-fatted solid material is pushed continuously from the interior of the centrifuge and passed into jacketed screw conveyor 19 provided with a cooling jacket 20. Screw conveyor 19 can be cooled by introducing either cold water or cold air into jacket 20. The crumbly de-fatted material will leave screw conveyor 19 at ambient temperature and pass over magnetic separator 21, through sifter 22 and hammermill 23 into storage bags 24.

Thus, the process of the present invention can be carried out by heating animal carcass portions, slaughter-house waste or the like under a pressure of 5 atmospheres to a temperature of 130° C. and maintaining these conditions for 30 minutes in order to sterilize the material (to break open fat-containing meat cells) and to cook the meat portions to a pulp. Thereafter, the pressure is reduced below atmospheric pressure so that the temperature of the mass will go down to about 70° C., and at such sub-atmospheric pressure which will cause the water to boil at about 70 C°., the mass is further cooked for a period of between 2 and 3 hours in order to reduce the water content of the mass to between 7 and 8%, whereby pulp-like mass is obtained in which still solid bone particles and the like are distributed.

Thereafter, the solid particles of bone and the like are removed by screening and the temperature in the residual mass is maintained above the melting point of the fatty constituents thereof.

The mass maintained at a temperature of above the melting point of its fatty constituents is then subjected to continuous centrifuging so that the liquid fat will be separated from the solid particles of the homogeneous pulp.

The thus de-fatted pulp residue is then cooled to ambient temperature while being passed to comminuting means such as a hammermill. In such hammermill or the like the de-fatted solid residue is ground to a flour-like consistency.

In order to proceed as described above in a continuous manner from the moment on when the mass leaves digester 1, usually several digesters 1 are employed which are alternatingly emptied so that a continuous flow of cooked material is introduced onto the bone separator. The temperature of 130° C. and the corresponding super atmospheric pressure have been chosen in order to comply with governmental regulations in Germany for the purpose of guaranteeing sterilization of the material. This super atmospheric pressure and the corresponding temperature may be varied to some extent in accordance with local conditions and requirements.

The following examples are given as illustrative only, the invention, not being limited to the specific details of the examples.

*Example I*

750 kilograms of subdivided meat of dead pigs unsuitable for human consumption together with 750 kilograms of slaughter-house waste such as intestines, heads, feet and the like, having an average composition of 7% meat, 3% bones, 15% fat and 75% water, are introduced into the digester vessel 2. Therein the above described 1500 kilograms of animal material are heated for 30 minutes at a pressure of 5 atmospheres and a temperature of 130° C. Thereby, with the help of stirring device 3 a comminution of the meat portions as well as of the major portion of the bone will take place. After these 30 minutes have passed, digester vessel 2 is connected with the outer atmosphere by opening the valve in conduit 6 and, after atmospheric pressure has been re-established in digester vessel 2, the valve in conduit 6 is closed and the valve connecting with injection condenser 7 is opened so that the vapors will be condensed and the interior of vessel 2 will be subjected to a sub atmospheric pressure. Thereby, the temperature will drop to between 70 and 75° C. and subsequently will slowly rise again to about 120° C. Water will evaporate so that the final water content of the meat will be reduced to between 7 and 8%. This procedure takes between 2 and 3 hours and thereby a meat pulp is formed which contains between 46 and 47% fat, between 7 and 8% water and between 45 and 46% of fat-free solids.

It is important to maintain a final moisture content of from 7 to 8% since at higher moisture content the pulp will become highly viscous and difficulties would arise during further processing. Furthermore, due to self-heating and decomposition, the storability of the finished product will be reduced when the water content thereof is higher than about 8%. A lower water content, below 7%, will not cause any operational difficulties, however, it would unnecessarily increase the power requirements. By proceeding in accordance with the present invention as described above, the generally feared "glue crisis" which consists in a hardening of the entire contents of vessel 2, will not occur. After the material in vessel 2 has been dried down to between 7 and 8% water content, the material is removed from vessel 2 through funnel 5 and the pulp is passed over a wide mesh shaking screen 8 in order to remove from the pulp larger bone particles and foreign bodies such as chain links or portions of slaughter-house tools. Thereafter, the pulp is passed into the drum of centrifuge 9, via a screw conveyor 11, surrounded by a heated trough 10. Trough or jacket 10 is heated in order to prevent cooling of the pulp, during passage towards the centrifuge, below the melting temperature of the fat. The centrifuge includes a drum 12 rotating about a horizontal axis and having an hourly capacity of 700 kilograms. The drum has a diameter of 400 millimeters and rotates with 2,500 r.p.m. For removal of the de-fatted meat pulp of crumbly consistency from drum 12, a bottom 13 is provided which can move in axial direction of the drum thus pushing the material stepwise across drum mantle 15 and the screen covering 14 thereon. An annular calibrating member 17 at the periphery of introducing funnel 16 will serve for equalizing the thickness of the layer of centrifuged material which passes out of the centrifuge.

The type of centrifuge described hereinabove, possesses the particular advantage that the meat pulp is de-fatted to a very high degree, due to the relatively small thickness of the layer of de-fatted material which passes out of the centrifuge, and due to the relatively long time during which the pulp will be centrifuged. Furthermore, the centrifuge described herein has a relatively high hourly capacity and, due to its continuous operation, requires very little labor and power.

Furthermore, a centrifuge such as described hereinabove operates in a clean manner without spraying material into the surrounding area. This hygienic feature is of particular importance in view of the type of material to be processed. The fat which is centrifuged and passes through mantle 15 into storage device 18, consists of about 1.5% solids which can be separated by settling for instance in vessel 18. The mud-like solids which are separated from the fat may be re-introduced into digester vessel 2. The fat, after separation from the solids is maintained in heatable storage tanks such as tank 18 until movement to its destination.

The solid material leaves centrifuge drum 12 of centrifuge 9 in a crumbly condition. It contains about 10% fat, 65% proteinous substances, 8% water and 17% nitrogen-free solids, of which about 5% are represented by bones. By means of the screw conveyor 19 operating in a water or air-cooled housing 20, the thus de-fatted meat mass is passed over electromagnetic drum 21 in order to remove any still retained small iron particles such as ear markings, and is then introduced into sifter 22. Cooling of conveyor housing 20 serves the purpose of preventing denaturation and smearing of the proteins which become dough-like and ropy at temperatures higher than ambient temperature. Thus, it is important that sifting is carried out at temperature of the material which does not substantially exceed ambient temperature.

While passing through the sifter, about 95% of finer particles are separated from about 5% of coarser particles and the coarser particles are then further comminuted in hammermill 23 whereafter the thus comminuted coarser particles and the sifted finer particles are joined together in a storage bin or are immediately filled into bags 24.

Thus, upon filling digester device 1 with 1,500 kilograms of animal material as described above, between about 750 and 800 kilograms of water is evaporated and between 700 and 750 kilograms of meat pulp including bones are drawn from digester vessel 2. After centrifuging, between about 300 and 350 kilograms of fat and between about 350 and 400 kilograms of meat meal are obtained.

Example II

Fish unsuitable for human consumption, for instance somewhat putrefied fat herrings, containing 70% water, 12% fat, 16% protein and 2% of protein free substances, are introduced into vessel 2 and are immediately heated under vacuum, starting with a partial pressure corresponding to a boiling point of water of 70° C. The temperature rises during a period of between 3 and 4 hours from 70° C. slowly to about 120° C. and during this period, the water content of the material is reduced to about 10%. The thus digested material is then passed on to shaking screen 8 and is from there on further treated as described in Example I. It is a particular advantage of the present method in connection with the processing of fish that the well-known "stick water problem" will not occur, and the losses on protein and other solids which are caused by the withdrawal of the stick water, can be prevented. The finished product obtained in this manner can be used for animal feed and contains about 11% water, 12% fat, 58% protein and 19% of non-protein solids.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for the extraction and treatment of animal material, comprising the steps of introducing into a treating vessel water-containing animal material including bone, fat and meat portions; subjecting said material in said treating vessel for a period of about 30 minutes to an absolute pressure of about 5 atmospheres and a first temperature of about 130° C. so as to break open fat-containing meat cells, to sterilize said material and to comminute at least a portion of said bones due to said elevated pressure and temperature; immediately thereafter subjecting said material in said treating vessel to a degree of sub-atmospheric pressure such that the water of said material will boil at a second temperature of about 70° C., and maintaining said material in said treating vessel at at least said second temperature and at said sub-atmospheric pressure until the water-content thereof is reduced to between about 7 and 9%, thereby transforming said fat and meat portions and at least part of said bone portion of said animal material into a pulp; thereafter continuously screening said pulp while maintaining the temperature thereof above the melting point of its fatty constituents so as to obtain a substantially homogeneous pulp; continuously introducing said screened pulp at a temperature above the melting point of its fatty constituents into a centrifuge rotatable about a substantially horizontal axis; continuously subjecting said screened pulp in said centrifuge to centrifuging at a temperature above the melting point of the fatty constituents of said pulp so as to separate fatty constituents therefrom and retaining in said centrifuge a pulp residue of greatly reduced fat content; recovering said separated fatty constituents; pushing said pulp residue of greatly reduced fat content out of the centrifuge in a direction substantially parallel to the axis thereof; recovering said pulp residue; cooling said recovered pulp residue to substantially ambient temperature thereby solidifying the same; and breaking up the thus-solidified pulp residue into smaller particles.

2. A method for the extraction and treatment of animal material, comprising the steps of introducing into a treating vessel water-containing animal material including bone, fat and meat portions; subjecting said material in said treating vessel to a pressure of several atmospheres and a first temperature of at least about 130° C. so as to break open fat-containing meat cells, to sterilize said material and to comminute at least a portion of said bones due to said elevated pressure and temperature; thereafter subjecting said material in said treating vessel to a degree of sub-atmospheric pressure such that the water of said material will boil at a second temperature of about 70° C., and maintaining said material in said treating vessel at at least said second temperature and at said sub-atmospheric pressure until the water-content thereof is reduced to between about 7 and 9%, thereby transforming said fat and meat portions and at least part of said bone portion of said animal material into a pulp; thereafter screening said pulp while maintaining the temperature thereof above the melting point of its fatty constituents so as to obtain a substantially homogeneous pulp; introducing said screened pulp at a temperature above the melting point of its fatty constituents into a centrifuge rotatable about a substantially horizontal axis; subjecting said screened pulp in said centrifuge to centrifuging at a temperature above the melting point of the fatty constituents of said pulp so as to separate fatty constituents therefrom and retaining in said centrifuge a pulp residue of greatly reduced fat content; recovering said separated fatty constituents; pushing said pulp residue of greatly reduced fat content out of the centrifuge in a direction substantially parallel to the axis thereof; and recovering said pulp residue.

3. A method for the extraction and treatment of animal material, comprising the steps of introducing into a treating vessel water-containing animal material including bone, fat and meat portions; subjecting said material in said treating vessel to a pressure of several atmospheres and a first elevated temperature of at least about 130° C. so as to break open fat-containing meat cells, to sterilize said material and to comminute at least a portion of said bones due to said elevated pressure and temperature; thereafter subjecting said material in said treating vessel to a partial vacuum at a second temperature below said first temperature so as to evaporate water from said material, reducing the moisture content thereof to between about 7 and 9%, thereby transforming said fat and meat portions and at least part of said bone portion of said animal material into a pulp; thereafter screening said pulp while maintaining the temperature thereof above the melting point of its fatty constituents so as to obtain a substantially homogeneous pulp; introducing said screened pulp at a temperature above the melting point of its fatty constituents into a centrifuge rotatable about a substantially horizontal axis; subjecting said screened pulp in said centrifuge to centrifuging at a temperature above the melting point of the fatty constituents of said pulp so as to separate fatty constituents therefrom and retaining in said centrifuge a pulp residue of greatly reduced fat content; recovering said separated fatty constituents; pushing said pulp of greatly reduced fat content out of the centrifuge in a direction substantially parallel to the axis thereof; and recovering said pulp residue.

References Cited in the file of this patent

UNITED STATES PATENTS

| | | |
|---|---|---|
| 1,518,926 | Hiller | Dec. 9, 1924 |
| 2,199,670 | Lowry | May 7, 1940 |
| 2,229,376 | Fauth et al. | Jan. 21, 1941 |
| 2,551,042 | Nyrop | May 1, 1951 |
| 2,673,790 | Illsley | Mar. 30, 1954 |
| 2,742,488 | Default | Apr. 17, 1956 |
| 2,745,856 | Dayen et al. | May 15, 1956 |
| 2,748,152 | Sifferd et al | May 29, 1956 |
| 2,823,215 | Downing | Feb. 11, 1958 |
| 3,025,315 | Krumm et al. | Mar. 13, 1962 |
| 3,046,286 | Speer et al. | July 24, 1962 |